J. W. JENNINGS.
CULTIVATOR.
APPLICATION FILED OCT. 2, 1911.
1,037,484. Patented Sept. 3, 1912.
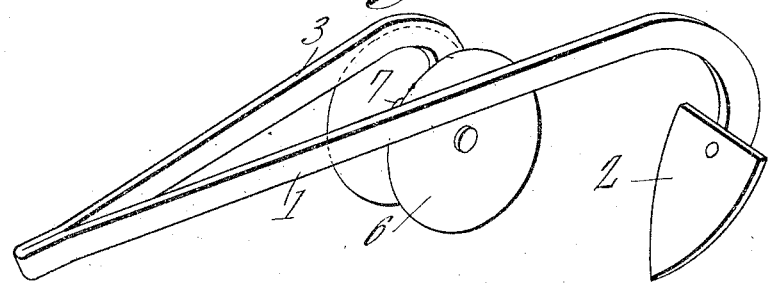
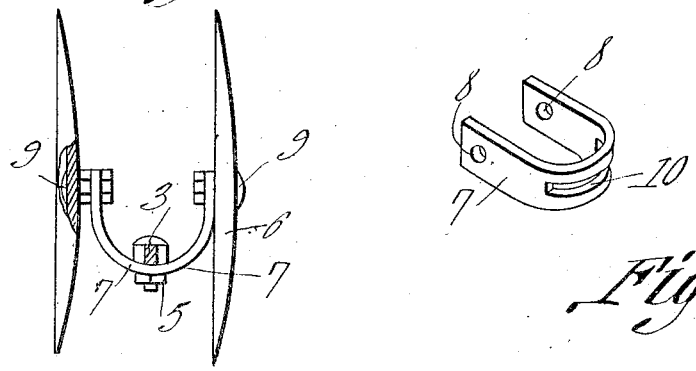
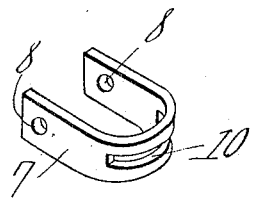
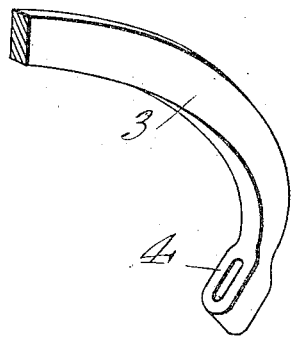
Joseph W. Jennings, Inventor
Witnesses
by C. A. Snow & Co., Attorneys

UNITED STATES PATENT OFFICE.

JOSEPH W. JENNINGS, OF QUINTON, OKLAHOMA.

CULTIVATOR.

1,037,484. Specification of Letters Patent. Patented Sept. 3, 1912.

Application filed October 2, 1911. Serial No. 652,369.

*To all whom it may concern:*

Be it known that I, JOSEPH W. JENNINGS, a citizen of the United States, residing at Quinton, in the county of Pittsburg and State of Oklahoma, have invented new and useful Improvements in Cultivators, of which the following is a specification.

This invention relates to improvements in cultivators, more especially the disk-type attachments therefor.

The invention has for its object to provide for promoting the cultivating of plants.

A further object is to effect the throwing of the soil or earth toward, or away from the plants.

A still further object is to provide for effecting the adjustment of the disk-shovels at varying angular positions.

A still further object is to carry out the aforesaid ends in a simple, expeditious, inexpensive and effective manner.

The invention consists of certain instrumentalities and features substantially as hereinafter fully disclosed and defined by the claims.

In the accompanying drawing, illustrating the preferred embodiment of my invention wherein it will be understood that various changes and modifications may be made as relates to the detailed construction and arrangement of the parts without departing from the spirit of my invention, Figure 1 is a perspective of a cultivator, shovel or plow beam equipped with a plow or shovel and disk shovel embracing my invention. Fig. 2 is a plan view, partly in section of parts disclosed in Fig. 1, at the left. Fig. 3 is a detailed perspective of the disk-shovel attaching and adjusting appliance. Fig. 4 is a partly sectional and perspective view of one of the plow or shovel beams.

In carrying out my invention, I provide in connection with a suitable beam 1 of the type usually employed in cultivators and which is provided or equipped with the ordinary cultivator shovel or plow foot 2, a wing-beam 3, either the right or the left, shown preferably as formed in continuation of the beam 1. These beams are preferably terminated at their lower or rear ends into slots or elongated openings 4 to provide, in connection with nut-equipped bolts 5 insertible through said slots or openings and the shovel or plow foot 2, for the attachment of the latter to a beam, or beams; the attaching means for the disk-shovels, however, including additional contrivances as next described.

Suitable disk-shaped shovels 6 preferably concavo-convex in outline and dished, are employed for aiding in effecting the cultivating operation. These disk-shaped shovels, as already stated, are applied to, or carried by the wing beams 3, either the right or the left, or to both the plow beam 1 and the wing beam 3, the plow-foot being displaced. The disk-shaped shovels, whose office is to throw the loose soil or earth to, or away from the plants, accordingly as the concavity, or convexity of said shovels or disks may be disposed with respect to the plants, are carried by a U-shaped attaching member or yoke 7. The yoke or attaching member 7 has its end-portions provided with apertures 8 which receive suitable nut and washer equipped bolt-like members or stub-axles 9 insertible through the disks or shovels at their centers. Either a single shovel or two shovels, may be applied to a single beam for use in connec 'on with a single foot-piece to throw the dir toward the plant; or the front shovel may be caused to throw the dirt away from the plants and the rear shovel to throw the dirt to the plants, or all of the shovels may be adjusted to throw the dirt one way, or to throw it in any direction as may be desired. This latter general adjustment of the disk-shovels is effected by providing the yoke 7 with a longitudinal or horizontal slot 10 coinciding with the arc or curvature of said yoke, said slot receiving the attaching bolt 5 effecting connection between said yoke and the beam, as clearly seen in Figs. 2 and 3. In order to that end, it will be seen that it is only required to loosen the nut of the bolt 5, and by suitably engaging, by hand, the yoke 7, or one or both of the disk-shovels 6, and suitably moving the same in the required direction, the desired angular or horizontal adjustment of the yoke may be secured, whereby the disk-shovels may be accordingly disposed with respect to the plow-foot as conditions become necessary in conducting the cultivating operation. The adjustment thus obtained is maintained simply by again tightening the nut of the bolt 5 against the yoke 7, the yoke in the meantime being manually retained in position until the tightening of the nut is effected.

It will be seen that, from the foregoing taken in connection with the accompanying illustration, I have provided a cultivating implement which is characterized for extreme simplicity of construction and accordingly inexpensive of manufacture, and which is readily applied for use in connection with any of the implements of this character or type now in vogue and which is effective for its intended purpose.

What is claimed is:

1. A cultivating implement including disk-shovels, a carrying beam having a downwardly extended plow-foot attaching end, a U-shaped attaching yoke between said disk-shovels and said plow-foot attaching end, said yoke having a slot extending through its curved or arcuate portion, and means for effecting connection between said yoke and said plow-foot attaching end, said means of connection extending through the slot of said yoke.

2. A cultivating implement, including a plow-foot carrying beam having a downwardly extending terminal provided with a slot, disk-shovels, a U-shaped attaching yoke having a slot extending through its arcuate or curved portion, said disk-shovels being carried by said yoke, at its ends and a securing nut-equipped bolt insertible through the slot of said plow-foot carrying beam and the slot of said yoke.

3. A cultivating implement, including a carrying beam having a downwardly and inwardly curved plow-foot attaching end said end having a slot therein, a U-shaped yoke having its trend in an upward and forward direction and provided with a slot in its central arcuate portion, means effecting connection between the slotted end of said carrying beam and the slotted arcuate portion of said yoke, disk-plows, and stub-axles carrying said disk-plows and themselves carried by said U-shaped yoke, at its ends.

In testimony that I claim the foregoing as my own, I have hereto affixed my signature in the presence of two witnesses.

JOSEPH W. JENNINGS.

Witnesses:
W. S. BRADEN,
J. W. BURNS.